United States Patent
Lin et al.

(10) Patent No.: US 9,201,587 B2
(45) Date of Patent: Dec. 1, 2015

(54) PORTABLE DEVICE AND OPERATION METHOD THEREOF

(71) Applicants: Yen-Lin Lin, Taipei (TW); Ming-Che Weng, Taipei (TW)

(72) Inventors: Yen-Lin Lin, Taipei (TW); Ming-Che Weng, Taipei (TW)

(73) Assignee: COMPAL ELECTRONICS, INC., Taipei (TW)

( * ) Notice: Subject to any disclaimer, the term of this patent is extended or adjusted under 35 U.S.C. 154(b) by 296 days.

(21) Appl. No.: 13/726,629

(22) Filed: Dec. 26, 2012

(65) Prior Publication Data

US 2013/0181952 A1 Jul. 18, 2013

Related U.S. Application Data

(60) Provisional application No. 61/586,832, filed on Jan. 15, 2012.

(51) Int. Cl.
*G06F 3/041* (2006.01)
*G06F 3/048* (2013.01)
*G06F 3/0488* (2013.01)

(52) U.S. Cl.
CPC .............. *G06F 3/0488* (2013.01); *G06F 3/041* (2013.01); *G06F 3/0418* (2013.01)

(58) Field of Classification Search
CPC ................................. G06F 3/041; G06F 3/048
USPC ................................................. 345/173–178
See application file for complete search history.

(56) References Cited

U.S. PATENT DOCUMENTS

| | | | |
|---|---|---|---|
| 2007/0236468 A1* | 10/2007 | Tuli | 345/173 |
| 2010/0245260 A1* | 9/2010 | Louch | 345/173 |
| 2011/0102556 A1* | 5/2011 | Kim et al. | 348/51 |

FOREIGN PATENT DOCUMENTS

| | | |
|---|---|---|
| TW | 200834397 | 8/2008 |
| TW | 200945126 | 11/2009 |
| TW | I326041 | 6/2010 |

OTHER PUBLICATIONS

"Office Action of Taiwan Counterpart Application", issued on Sep. 23, 2014, p. 1-12.

* cited by examiner

*Primary Examiner* — Kathy Wang-Hurst
*Assistant Examiner* — David Tung
(74) *Attorney, Agent, or Firm* — Jianq Chyun IP Office (57) ABSTRACT

A portable apparatus and an operation method thereof are provided. The portable apparatus has a screen and a touch pad, and a touch area of the touch pad is mapped to a display area of the screen. In the operation method, a first touch operation is detected by using the touch pad, and a cue area is displayed at a first display position on the screen mapped to a first touch position of the first touch operation. A second touch operation is detected by using the touch pad, and whether a second display position on the screen mapped to a second touch position of the second touch operation is within the cue area is determined. If the second display position is within the cue area, an operation function is executed on an object within the cue area. Otherwise, the cue area is moved to the second display position.

11 Claims, 6 Drawing Sheets

PORTABLE DEVICE AND OPERATION METHOD THEREOF

CROSS-REFERENCE TO RELATED APPLICATION

This application claims the priority benefits of U.S. provisional application Ser. No. 61/586,832, filed on Jan. 15, 2012. The entirety of the above-mentioned patent applications is hereby incorporated by reference herein and made a part of this specification.

BACKGROUND OF THE INVENTION

1. Field of the Invention

The invention generally relates to an electronic apparatus and an operation method thereof, and more particularly, to a portable apparatus and a touch operation method thereof.

2. Description of Related Art

Along with the development of electronic technologies and the widespread of electronic applications, electronic apparatuses have been broadly used in different industries. People use different input devices (for example, keyboards, mouses, touch pads, and track balls) for data input and operation control. Among different types of input devices, touch pad is broadly adopted in different electronic products, such as notebook computers, tablet PCs, personal digital assistants (PDAs), and smart phones, thanks to its convenience and space efficiency.

To simulate the function of a mouse, a conventional touch pad usually comes with a mechanical button located at one side of the touch pad. A user can move the cursor on a screen by sliding on the touch pad, select an object pointed by the cursor by pressing down the button, and drag the object pointed by the cursor by pressing down the button and sliding on the touch pad at the same time. However, to simplify the operation, usually no cursor is displayed in the operating systems (for example, Android and Windows mobile) of today's tablet PCs and smart phones. Instead, aforementioned functions are accomplished through direct screen touching. However, when a user connects such an apparatus to a corresponding dock and operates the apparatus through a touch pad on the dock, because the touch pad is not directly corresponded to the screen, a touch position of the user's finger may not be corresponded to an object on the screen, which may cause a misoperation of the apparatus.

SUMMARY OF THE INVENTION

Accordingly, the invention is directed to a portable apparatus and an operation method thereof, which increases convenience for a user to operate a portable apparatus.

The invention is directed to an operation method of a portable apparatus. The portable apparatus has a screen and a touch pad. In the operation method, a first touch operation is detected by using the touch pad, and a cue area is displayed at the first display position on the screen mapped to a first touch position of the first touch operation, where a touch area of the touch pad is corresponding to a display area of the screen. A second touch operation is detected by using the touch pad, and whether a second display position on the screen mapped to a second touch position of the second touch operation is within the cue area is determined. If the second display position is within the cue area, an operation function is executed on an object within the cue area. If the second display position is not within the cue area, the cue area is moved to the second display position.

According to an embodiment of the invention, the step of detecting the first touch operation by using the touch pad and displaying the cue area at the first display position on the screen mapped to the first touch position of the first touch operation further detects a first drag path of the first touch operation, and moves the cue area according to a first moving path on the screen mapped to the first drag path.

According to an embodiment of the invention, after the step of detecting the first touch operation by using the touch pad and displaying the cue area at the first display position on the screen mapped to the first touch position of the first touch operation, the operation method further accumulates an idle time of the touch pad during which the second touch operation is not detected, and determines whether the idle time exceeds a predetermined time. When the idle time exceeds the predetermined time, the cue area is removed, and a next touch operation is detected to display the cue area.

According to an embodiment of the invention, if the second display position on the screen mapped to the second touch position of the second touch operation is within the cue area, the operation method further detects a second drag path of the second touch operation, and moves the cue area according to a second moving path on the screen mapped to the second drag path.

According to an embodiment of the invention, after the step of detecting the second drag path of the second touch operation and moving the cue area according to the second moving path on the screen mapped to the second drag path, the operation method further detects a third touch operation by using the touch pad, and determines whether a third display position on the screen mapped to a third touch position of the third touch operation is within the cue area. If the third display position is within the cue area, the operation function is executed on the object within the cue area. If the third display position is not within the cue area, the cue area is moved to the third display position.

The invention provides a portable apparatus including a screen, a touch pad, and a processing unit. The screen has a display area. The touch pad is coupled to the screen, where a touch area of the touch pad is mapped to the display area of the screen. The processing unit is coupled to the screen and the touch pad. The processing unit detects a first touch operation through the touch pad and displays a cue area at a first display position on the screen mapped to a first touch position of the first touch operation. Besides, the processing unit detects a second touch operation through the touch pad and determines whether a second display position on the screen mapped to a second touch position of the second touch operation is within the cue area. If the second display position is within the cue area, the processing unit executes an operation function on an object within the cue area. If the second display position is not within the cue area, the processing unit moves the cue area to the second display position.

According to an embodiment of the invention, the touch pad detects a first drag path of the first touch operation, and the processing unit moves the cue area according to a first moving path on the screen mapped to the first drag path.

According to an embodiment of the invention, the processing unit accumulates an idle time of the touch pad during which the second touch operation is not detected and determines whether the idle time exceeds a predetermined time. When the idle time exceeds the predetermined time, the processing unit removes the cue area and detects a next touch operation through the touch pad to display the cue area.

According to an embodiment of the invention, the touch pad detects a second drag path of the second touch operation, and the processing unit moves the cue area according to a second moving path on the screen mapped to the second drag path.

According to an embodiment of the invention, the processing unit detects a third touch operation through the touch pad and determines whether a third display position on the screen mapped to a third touch position of the third touch operation is within the cue area. If the third display position is within the cue area, the processing unit executes the operation function on the object within the cue area. If the third display position is not within the cue area, the processing unit moves the cue area to the third display position.

The invention provides a portable apparatus including a screen, a touch pad, and a processing unit. The screen has a display area. The touch pad is coupled to the screen and has a touch area. The touch area of the touch pad is mapped to the display area of the screen. The processing unit is coupled to the screen and the touch pad. The processing unit detects a first touch operation through the touch pad, during which the portable apparatus is in an absolute coordinate mode. The processing unit displays a cue area at a first display position on the screen mapped to a first touch position of the first touch operation. The processing unit detects a second touch operation through the touch pad and determines an interval between the first touch operation and the second touch operation. When the interval between the first touch operation and the second touch operation is smaller than a predetermined value, the processing unit switches the portable apparatus to a relative coordinate mode. When the interval between the first touch operation and the second touch operation exceeds the predetermined value, the processing unit does not switch the mode of the portable apparatus and removes the cue area.

As described above, in the portable apparatus and the operation method thereof of the invention, the touch area of a touch pad is mapped to the display area of a screen, so that a touch operation of a user can be mapped to the screen so as to display a cue area at the mapped position for the user to operate. Accordingly, the user can directly tap on or start objects displayed on the screen by performing touch operations on the touch pad. Thereby, the operation method of the invention allows the user to operate the portable apparatus conveniently.

These and other exemplary embodiments, features, aspects, and advantages of the invention will be described and become more apparent from the detailed description of exemplary embodiments when read in conjunction with accompanying drawings.

BRIEF DESCRIPTION OF THE DRAWINGS

The accompanying drawings are included to provide a further understanding of the invention, and are incorporated in and constitute a part of this specification. The drawings illustrate embodiments of the invention and, together with the description, serve to explain the principles of the invention.

DESCRIPTION OF THE EMBODIMENTS

Reference will now be made in detail to the present preferred embodiments of the invention, examples of which are illustrated in the accompanying drawings. Wherever possible, the same reference numbers are used in the drawings and the description to refer to the same or like parts.

By observing the touch operations performed by a user on a touch screen, it can be understood that when an object displayed on the touch screen is operated, the touch position of the user's finger is the display position of the object. Because the display area on the touch screen is the same as the touch area on the touch screen, the touch position of the user's finger can be directly mapped to the display position of the object to operate the object. Accordingly, in the invention, when the touch operation is performed on a touch pad, the touch area of the touch pad is directly mapped to the display area of the screen, and a cue area is displayed at the position on the screen mapped to the touch position, so that the position of the touch operation can be identified by the user and an intuitional operation experience similar to that on a touch screen can be brought to the user. Based on the concept described above, the invention provides a portable apparatus and an operation method thereof. Below, exemplary embodiments of the invention will be described with reference to accompanying drawings.

Figure 1A:
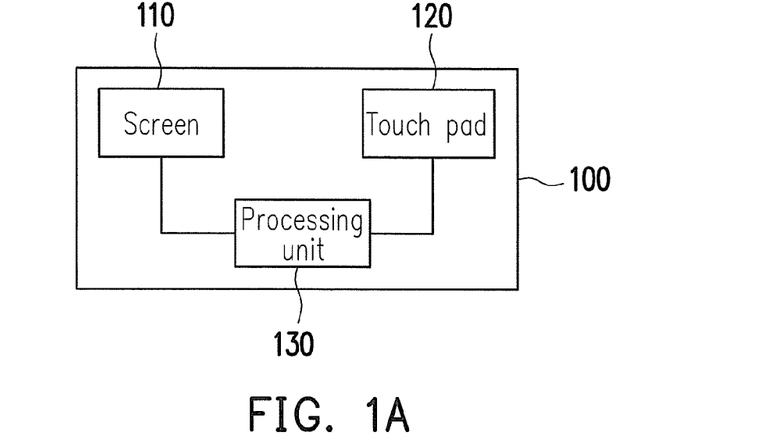
FIG. 1A is a block diagram of a portable apparatus according to an embodiment of the invention.
Figure 1B:
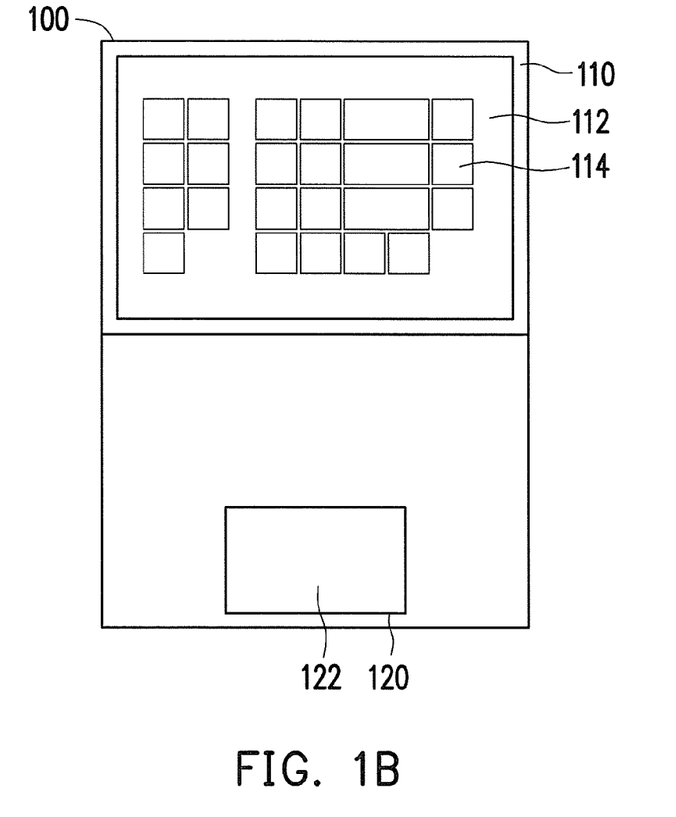
FIG. 1B is a schematic diagram of a portable apparatus according to an embodiment of the invention.

FIG. 1A is a block diagram of a portable apparatus according to an embodiment of the invention. FIG. 1B is a schematic diagram of a portable apparatus according to an embodiment of the invention. Referring to FIG. 1A and FIG. 1B, the portable apparatus 100 in the present embodiment is an electronic apparatus with display function, such as a notebook computer, a tablet PC, a personal digital assistant (PDA), a smart phone, an e-book, or a game console. However, the type of the portable apparatus 100 is not limited in the invention. The portable apparatus 100 includes a screen 110, a touch pad 120, and a processing unit 130. The functions of these components will be respectively explained below.

The screen 110 has a display area 112, and a user interface 114 is displayed in the display area 112 such that a user can operate the portable apparatus 100. In the present embodiment, the user interface 114 is a tile interface provided by a Windows operating system. However, the invention is not limited thereto, and in other embodiments, a webpage browsing interface, an e-mail interface, a desktop background, or a display interface provided by a software program may be displayed in the display area 112 of the screen 110. In the present embodiment, the screen 110 may be a liquid crystal display (LCD), a light-emitting diode (LED) display, a field emission display (FED), or any other type of display. However, in other embodiments, the screen 110 may also be a display integrated with a resistive touch panel, a capacitive touch panel, or any other type of touch panel, such that the screen 110 can offer both a display function and an input function.

The touch pad 120 is coupled to the screen 110. The touch pad 120 may be an input interface of the portable apparatus 100. The touch pad 120 has a touch area 122 for receiving touch operations of a user. In the present embodiment, the touch area 122 of the touch pad 120 is mapped to the display area 112 of the screen 110. In addition, the touch pad 120 in the present embodiment may be a resistive touch pad, a capacitive touch pad, an infrared touch pad, or an ultrasound touch pad. However, the type of the touch pad 120 is not limited in the invention.

The processing unit 130 is coupled to the screen 110 and the touch pad 120 and configured to control the operation of the portable apparatus 100. For example, the processing unit 130 executes a corresponding operation function and controls the screen 110 to display a corresponding image according to a touch operation detected by the touch pad 120. In the present embodiment, the processing unit 130 may be a central processing unit (CPU), a programmable microprocessor, a digital signal processor (DSP), a programmable controller, an application specific integrated circuit (ASIC), a programmable logic device (PLD), or any other operational hardware device.

Figure 2:
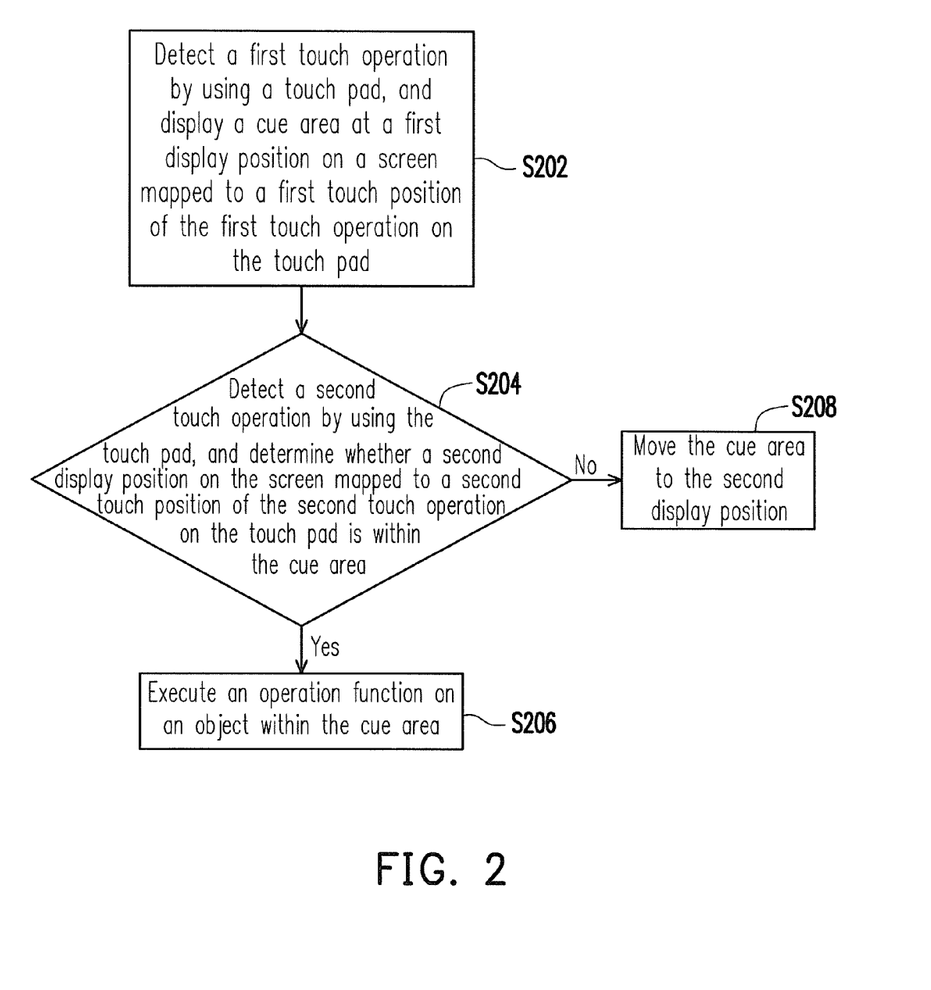
FIG. 2 is a flowchart of an operation method of a portable apparatus according to an embodiment of the invention.

FIG. 2 is a flowchart of an operation method of a portable apparatus according to an embodiment of the invention. Referring to both FIG. 1A and FIG. 2, the operation method in the present embodiment is adapted to the portable apparatus 100 described above. Below, the operation method in the present embodiment will be described in detail with reference to various components of the portable apparatus 100.

First, the processing unit 130 detects a first touch operation performed by the user through the touch pad 120 and displays a cue area at a first display position on the screen 110 mapped to a first touch position of the first touch operation (step S202). The touch area 122 of the touch pad 120 is mapped to the display area 112 of the screen 110. To be specific, the coordinates of each touch sensing unit in the touch area 122 of the touch pad 120 are mapped to the coordinates of each pixel in the display area 112 of the screen 110. Besides, aforementioned cue area may be a block displayed with the first display position as its center. The processing unit 130 may determine the shape (for example, a square or circular shape) and size of the cue area according to system default values or user settings. The first touch operation may be a tap operation or a drag operation. However, the invention is not limited thereto.

Then, the processing unit 130 detects a second touch operation through the touch pad 120 and determines whether a second display position on the screen mapped to a second touch position of the second touch operation is within the cue area (step S204). The second touch operation may be a tap operation or a drag operation. It should be mentioned that because the second touch position of the second touch operation is mapped to the second display position on the screen 110, the processing unit 130 may also determine whether the second touch operation is mapped to the cue area by determining whether the second touch position of the second touch operation on the touch pad 120 is within a predetermined touch block. Herein the touch block on the touch pad 120 is corresponding to the cue area on the screen 110.

If the second display position is within the cue area, the processing unit 130 executes a corresponding operation function on an object within the cue area (step S206). Aforementioned object may be a file icon, an application program icon, or a software button in the display area 112 of the screen 110. However, the type of the object is not limited herein. When there are multiple objects within the cue area, the processing unit 130 may execute the operation function on the object located at or close to the center of the cue area. For example, if the center of the cue area is located on a specific application program icon, the processing unit 130 starts the application program. It should be noted that if there is no operable object within the cue area, the processing unit 130 does not generate any operation function corresponding to the second touch operation. Instead, the processing unit 130 keeps displaying the cue area or removes the cue area. Thus, the user can identify the second display position on the screen 110 mapped to the current second touch operation according to the cue area displayed on the screen 110, so as to operate an object within the cue area.

On the other hand, if the second display position is not within the cue area, the processing unit 130 moves the cue area to the second display position (step S208). Namely, when the second display position on the screen 110 mapped to the second touch position of the second touch operation is not within the cue area, the processing unit 130 considers the touch operation as an operation for moving the cue area instead of an operation on an object within the cue area. From another view point, the second touch operation is equivalent to another first touch operation. Namely, the processing unit 130 displays the cue area at a second display position on the screen 110 mapped to the second touch position and detects a next touch operation to determine whether to perform an operation on an object within the cue area or move the cue area again.

Figure 3:
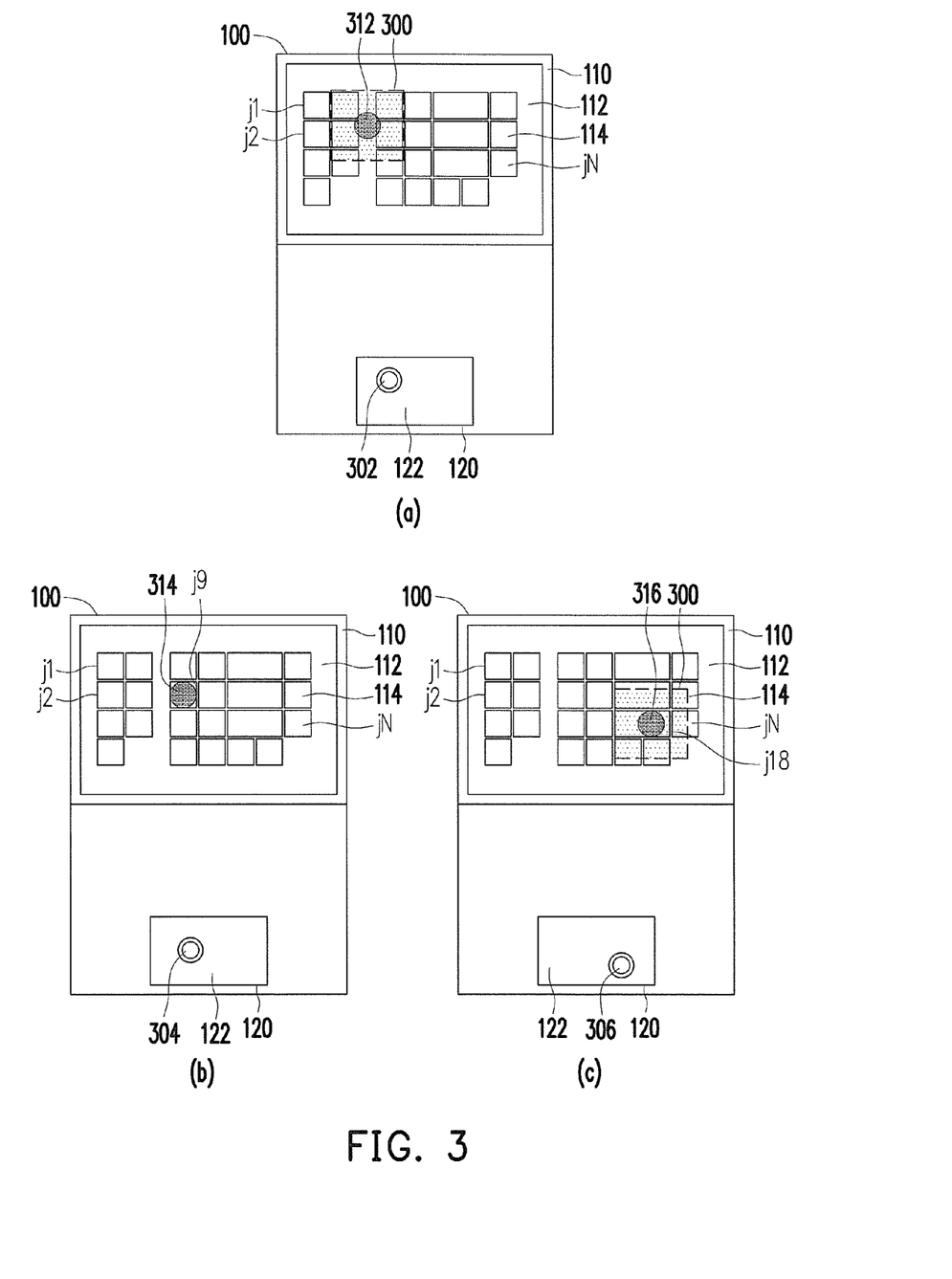
FIGS. 3(a), 3(b), and 3(c) are schematic diagrams of an operation method of a portable apparatus according to an embodiment of the invention.

FIGS. 3(*a*), 3(*b*), and 3(*c*) are schematic diagrams of an operation method of a portable apparatus according to an embodiment of the invention. Referring to FIG. 3(*a*) first, the structure of the portable apparatus 100 illustrated in FIG. 1B is adopted in the present embodiment. Namely, a user interface 114 is displayed in the display area 112 of the screen 110. Herein the user interface 114 includes a plurality of objects j1-jN, where N is a positive integer. In addition, the touch area 122 of the touch pad 120 is mapped to the display area 112 of the screen 110.

When a user performs a first touch operation in the touch area 122 of the touch pad 120, the processing unit 130 detects a first touch operation through the touch pad 120. The touch position 302 in FIG. 3(*a*) is the position of the first touch operation on the touch pad 120. Then, the processing unit 130 displays a cue area 300 at a display position 312 on the screen 110 mapped to the touch position 302 of the first touch operation, where the touch position 302 is mapped to the display position 312. Next, the processing unit 130 detects a second touch operation through the touch pad 120 and determines whether a display position on the screen 110 mapped to the touch position of the second touch operation is within the cue area 300.

Referring to FIG. 3(*a*) and FIG. 3(*b*), when the second touch operation is performed at the touch position 304 on the touch pad 120 and the processing unit 130 determines that the display position 314 on the screen 110 mapped to the touch position 304 is within the cue area 300, the processing unit 130 executes a corresponding operation function on the object j9 close to the center of the cue area 300. Referring to FIG. 3(*a*) and FIG. 3(*c*), when the second touch operation is performed at the touch position 306 on the touch pad 120 and the processing unit 130 determines that the display position 316 on the screen 110 mapped to the touch position 306 is not within the cue area 300, the processing unit 130 moves the cue area 300 to the second display position 316. Thereby, the user can identify the corresponding position of the second touch operation on the screen 110 through the screen 110.

Additionally, in another embodiment of the invention, the processing unit 130 further controls the display position of the cue area on the screen 110 according to the touch duration and the touch pattern (for example, a tap operation or a drag operation) of the touch operation detected by the touch pad 120. Below, this process will be described in detail with reference to another embodiment.

Figure 4:
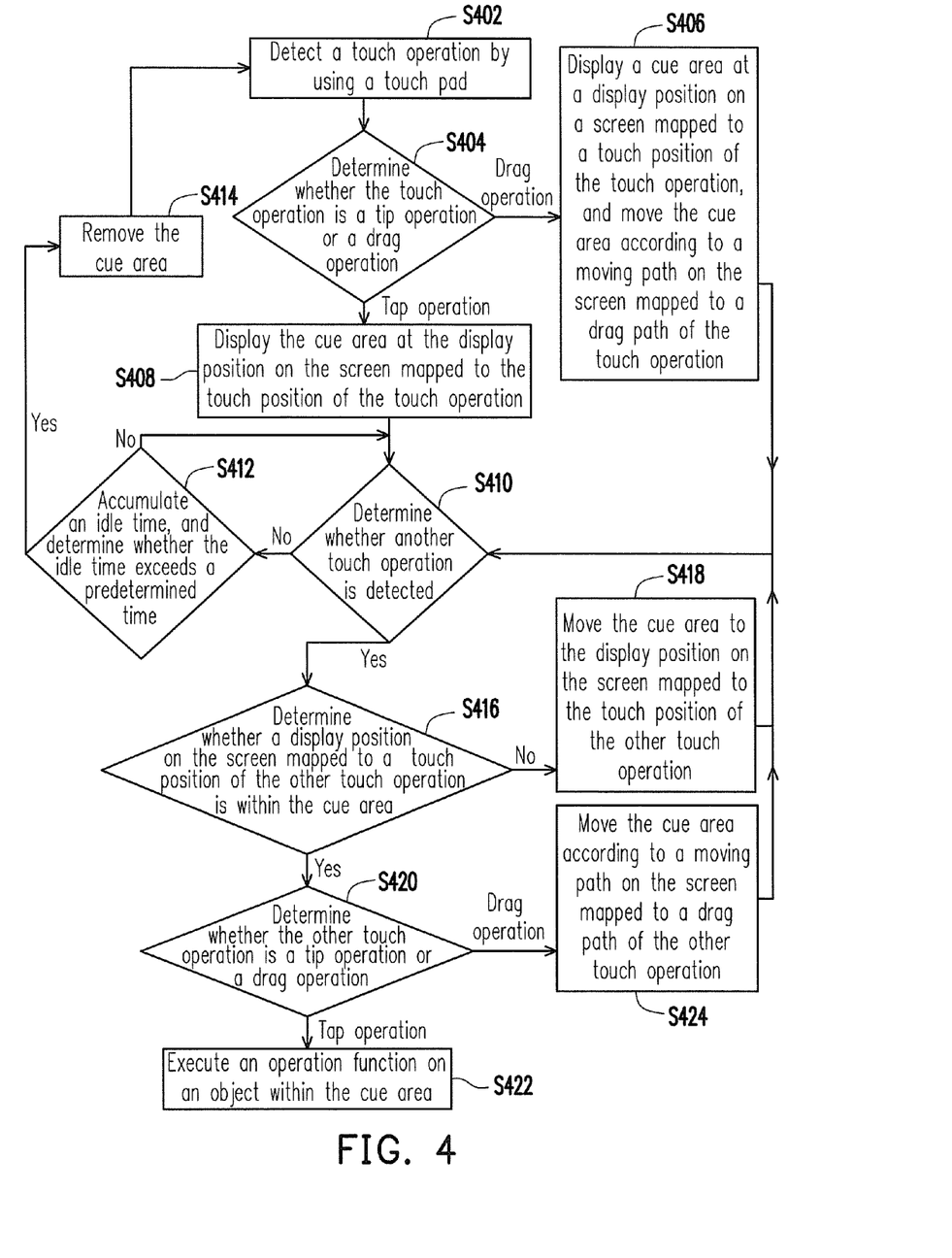
FIG. 4 is a flowchart of an operation method of a portable apparatus according to an embodiment of the invention.

FIG. 4 is a flowchart of an operation method of a portable apparatus according to an embodiment of the invention. Referring to both FIG. 1A and FIG. 4, the operation method in the present embodiment is adapted to the portable apparatus 100 described above. Below, the operation method in the present embodiment will be described in detail with reference to various components of the portable apparatus 100.

First, the processing unit 130 detects a first touch operation through the touch pad 120 (step S402). Then, the processing unit 130 determines whether the first touch operation is a tap operation or a drag operation (step S404). For example, the processing unit 130 identifies the first touch operation according to how long the first touch operation remains on the touch pad 120. If the first touch operation remains on the touch pad 120 for a time shorter than a threshold value, the processing unit 130 determines that the first touch operation is a tap operation. If the first touch operation remains on the touch pad 120 for a time longer than the threshold value, the processing unit 130 determines that the first touch operation is a drag operation.

When the processing unit 130 determines that the first touch operation is a drag operation, the processing unit 130 displays a cue area at a first display position on the screen mapped to a first touch position of the first touch operation and moves the cue area according to a moving path on the screen mapped to the drag path of the first touch operation (step S406). Namely, the processing unit 130 moves the cue area to a display position on the screen mapped to the final position of the first touch operation.

On the other hand, when the processing unit 130 determines that the first touch operation is a tap operation, the processing unit 130 also displays the cue area at the first display position on the screen mapped to the first touch position of the first touch operation (step S408).

After displaying or moving the cue area, the processing unit 130 continues to detect a second touch operation through the touch pad 120 and determines whether the second touch operation is detected (step S410). If the processing unit 130 does not detect the second touch operation, it accumulates an idle time of the touch pad 120 during which the second touch operation is not detected and determines whether the idle time exceeds a predetermined time (step S412). If the processing unit 130 determines that the accumulated idle time exceeds the predetermined time, it removes the cue area (step S414) and detects a next touch operation through the touch pad 120 (step S402). Contrarily, if the processing unit 130 determines that the idle time does not exceed the predetermined time, it determines whether the touch pad 120 detects another touch operation (step S410).

On the other hand, if the processing unit 130 detects a second touch operation through the touch pad 120, it further determines whether a second display position on the screen 110 mapped to the touch position of the second touch operation is within the cue area (step S416). If the processing unit 130 determines that the second display position is not within the cue area, it moves the cue area to the second display position (step S418).

However, if the processing unit 130 determines that the second display position is within the cue area, the processing unit 130 further determines whether the second touch operation is a tap operation or a drag operation (step S420). If the processing unit 130 determines that the second touch operation is a tap operation, the processing unit 130 executes an operation function on an object within the cue area (step S422). Contrarily, if the processing unit 130 determines that the second touch operation is a drag operation, it detects a drag path of the second touch operation through the touch pad 120 and moves the cue area according to a moving path on the screen 110 mapped to the drag path of the second touch operation (step S424).

It should be noted that after steps S418 and S424, the processing unit 130 further determines whether the touch pad 120 detects a third touch operation (step S410). If the touch pad 120 detects the third touch operation, the processing unit 130 further determines whether a third display position on the screen 110 mapped to a third touch position of the third touch operation is within the cue area (step S416) and executes steps S412-S422 again. Namely, if the third display position on the screen 110 mapped to the third touch position of the third touch operation is not within the cue area displayed at the second display position, the processing unit 130 moves the cue area to the third display position (step S418). Otherwise, the processing unit 130 executes a corresponding operation function or moves the cue area based on whether the third touch operation is a tap operation or a drag operation.

In the present embodiment, the processing unit 130 detects a first touch operation through the touch pad 120 (step S402). Then, the processing unit 130 determines whether the first touch operation is a tap operation or a drag operation (step S404). For example, the processing unit 130 identifies the first touch operation according to how long the first touch operation remains on the touch pad 120. Herein the portable apparatus 100 is in an absolute coordinate mode. When the interval between the first touch operation and the second touch operation is smaller than a threshold value, the processing unit 130 switches the portable apparatus 100 to a relative coordinate mode. When the interval between the first touch operation and the second touch operation exceeds the threshold value, the processing unit 130 does not switch the mode of the portable apparatus 100.

Figure 5:
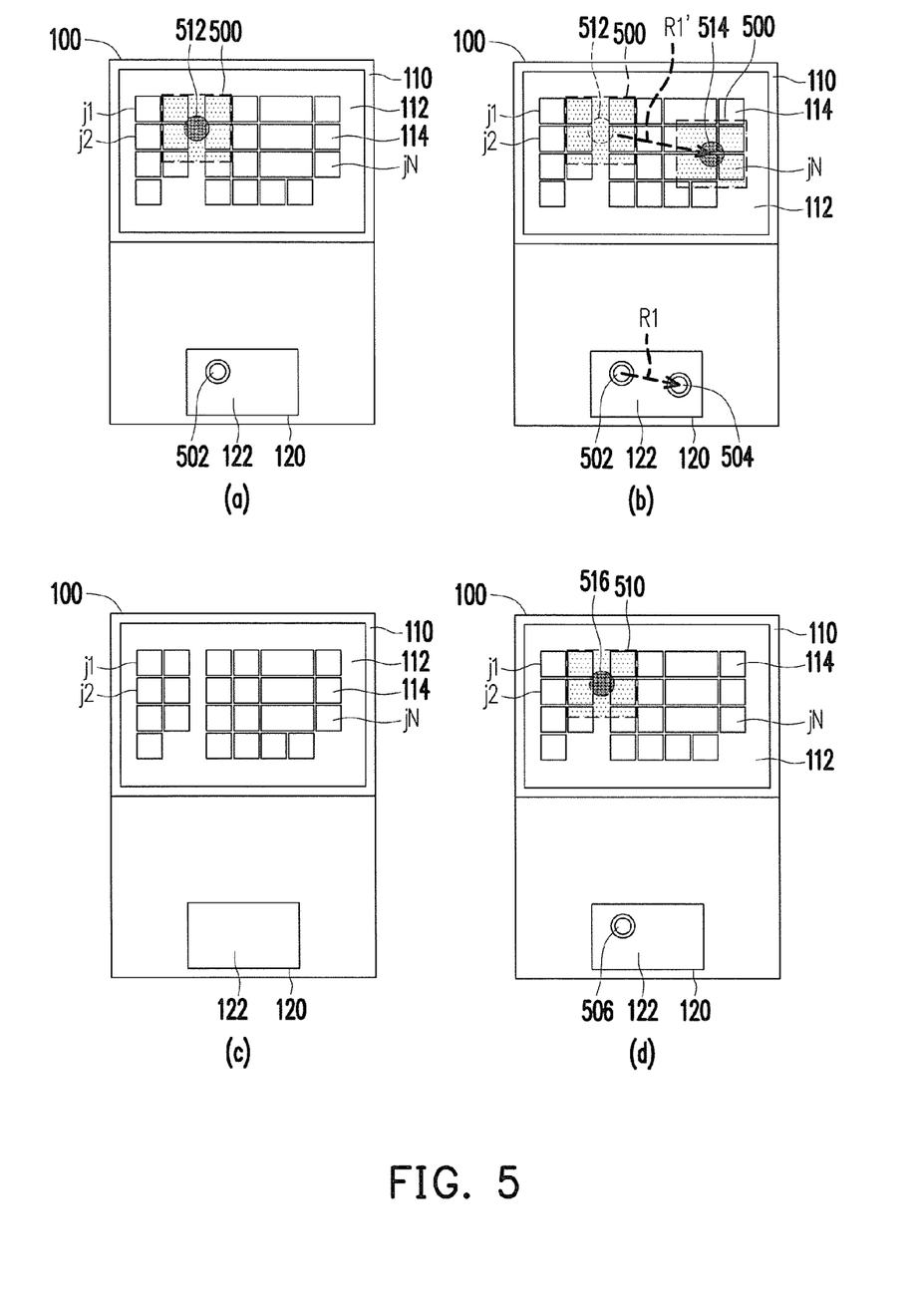
FIGS. 5(a), 5(b), 5(c), and 5(d) are schematic diagrams of an operation method of a portable apparatus according to an embodiment of the invention.

FIGS. 5(a), 5(b), 5(c), and 5(d) are schematic diagrams of an operation method of a portable apparatus according to an embodiment of the invention. Referring to FIG. 5(a) first, the structure of the portable apparatus 100 illustrated in FIG. 1B is adopted in the present embodiment. Namely, a user interface 114 is displayed in the display area 112 of the screen 110. The user interface 114 includes a plurality of objects j1-jN, where N is a positive integer. In addition, the touch area 122 of the touch pad 120 is mapped to the display area 112 of the screen 110.

First, the processing unit 130 detects a first touch operation performed by a user through the touch pad 120. The touch position 502 in FIG. 5(a) is the position of the first touch operation on the touch pad 120. Besides, the processing unit 130 displays a cue area 500 at a display position 512 on the screen 110 mapped to the touch position 502 of the first touch operation. The touch area 122 of the touch pad 120 is mapped to the display area 112 of the screen 110.

If the first touch operation performed by the user is a drag operation, as shown in FIG. 5(a) and FIG. 5(b), the touch pad 120 detects a drag path R1 of the first touch operation, and the processing unit 130 moves the cue area 500 according to a moving path R1' on the screen 110 mapped to the drag path R1. For example, assuming that the drag path R1 is from the touch position 502 to the touch position 504, the moving path R1' on the screen 110 is then from the display position 512 to the display position 514. Herein the display position 512 is the position on the screen 110 mapped to the touch position 502, and the display position 514 is the position on the screen 110 mapped to the touch position 504. Thus, the processing unit 130 moves the cue area 500 from the display position 512 to the display position 514.

To be specific, if the idle time of the touch pad 120 (during which no second touch operation is detected) exceeds a predetermined time after the cue area 500 is moved to the display position 514, as shown in FIG. 5(c), the processing unit 130 removes the cue area 500 and detects a next touch operation through the touch pad 120 and displays another cue area (for example, the touch position 506 and the cue area 510 at the corresponding display position 516 on the screen 110 illustrated in FIG. 5(d)).

On the other hand, referring to FIG. 5(a) again, if the first touch operation performed by the user is a tap operation, the processing unit 130 simply displays the cue area 500 at the display position 512 on the screen 110 mapped to the touch position 502 of the first touch operation. If the idle time of the touch pad 120 (during which no second touch operation is detected) exceeds the predetermined time after the cue area 500 is displayed, as shown in FIG. 5(c), the processing unit 130 removes the cue area 500, detects a next touch operation through the touch pad 120, and displays another cue area (for example, the touch position 506 and the cue area 510 at the corresponding display position 516 on the screen 110 illustrated in FIG. 5(d)).

It should be mentioned that when a cue area is displayed, if the processing unit 130 detects a second touch operation through the touch pad 120 and determines that a second display position on the screen 110 mapped to the touch position of the second touch operation is within the cue area, the processing unit 130 moves the cue area or executes a corresponding operation function on an object within the cue area according to the second touch operation. Below, this process will be described in detail with reference to another embodiment.

Figure 6:
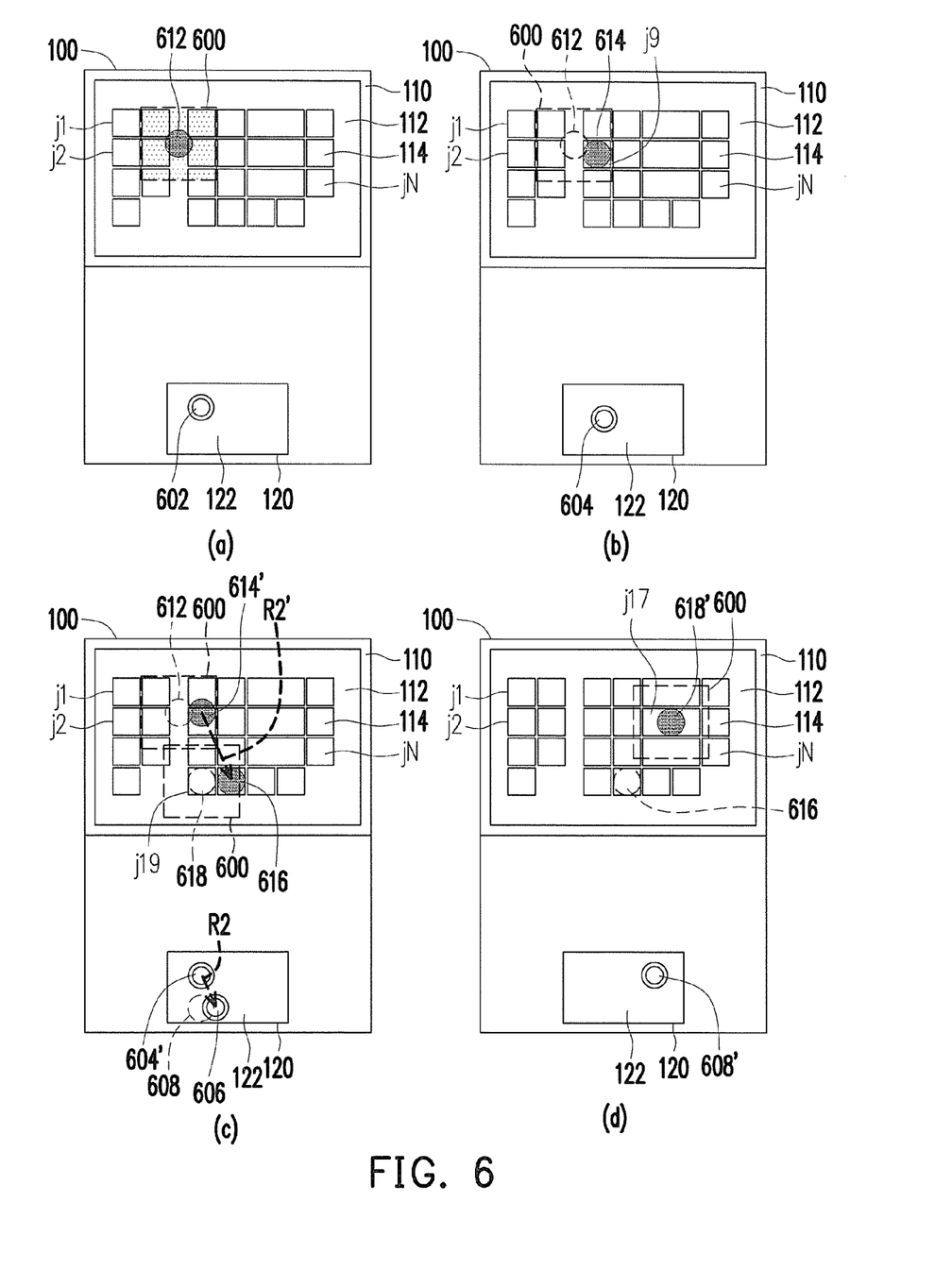
FIGS. 6(a), 6(b), 6(c), and 6(d) are schematic diagrams of an operation method of a portable apparatus according to an embodiment of the invention.

FIGS. 6(a), 6(b), 6(c), and 6(d) are schematic diagrams of an operation method of a portable apparatus according to an embodiment of the invention. Referring to FIG. 6(a) first, the structure of the portable apparatus 100 illustrated in FIG. 1B is adopted in the present embodiment. Namely, a user interface 114 is displayed in the display area 112 of the screen 110. The user interface 114 includes a plurality of objects j1-jN, wherein N is a positive integer. In addition, the touch area 122 of the touch pad 120 is mapped to the display area 112 of the screen 110.

Referring to FIG. 6(b), if the second touch operation is a tap operation and the processing unit 130 determines that the display position 614 on the screen 110 mapped to the touch position 604 of the second touch operation is within the cue area 600, the processing unit 130 executes a corresponding operation function on an object j9 around the center of the cue area 600.

Referring to FIG. 6(c), if the second touch operation is a drag operation and the processing unit 130 determines that the display position 614' on the screen 110 mapped to the touch position 604' of the second touch operation is within the cue area 600, the processing unit 130 further detects a drag path R2 of the second touch operation and moves the cue area 600 according to a moving path R2' on the screen 110 mapped to the drag path R2 (for example, moves the cue area 600 to the display position 616 on the screen 110 mapped to the touch position 606). Thus, a user can identify the corresponding position of the second touch operation on the screen 110 through the cue area 600 displayed on the screen 110.

It should be mentioned that the processing unit 130 further detects a third touch operation through the touch pad 120 and determines whether the third touch operation is within the cue area 600 displayed at the display position 616 corresponding to the second touch operation, so as to move the cue area 600 or execute a corresponding operation function on an object within the cue area 600.

Referring to FIG. 6(c), if the third display position 618 (for example, the position of the object j19) on the screen 110 corresponding to the third touch operation is within the cue area 600, the processing unit 130 executes an operation function corresponding to the third touch operation on an object within the cue area 600. However, referring to FIG. 6(d), if the third display position 618' (for example, the position of the object j17) on the screen 110 mapped to the touch position of the third touch operation is not within the cue area 600, the processing unit 130 moves the cue area 600 to the display position 618'.

As described above, in a portable apparatus and an operation method thereof provided by the invention, the touch area of a touch pad is mapped to the display area of a screen, and a processing unit displays a cue area at the position on the screen mapped to the position of the touch operation on the touch pad. Thus, a user can identify the corresponding position of the touch operation on the screen through the cue area and can operate an object within the cue area or move the cue area accordingly. Thereby, the user can intuitively tap or start any object displayed on the screen. In other words, the user can operate the portable apparatus conveniently.

It will be apparent to those skilled in the art that various modifications and variations can be made to the structure of the invention without departing from the scope or spirit of the invention. In view of the foregoing, it is intended that the invention cover modifications and variations of this invention provided they fall within the scope of the following claims and their equivalents.

What is claimed is:

1. An operation method of a portable apparatus, the portable apparatus has a screen and a touch pad, wherein a touch area of the touch pad is mapped to a display area of the screen, the operation method comprising:

detecting a first touch operation by using the touch pad, during which the portable apparatus is in an absolute coordinate mode, and displaying a cue area at a first display position on the screen mapped to a first touch position of the first touch operation on the touch pad;

detecting a second touch operation by using the touch pad, and determining an interval between the first touch operation and the second touch operation;

when the interval between the first touch operation and the second touch operation exceeds a predetermined value, removing the cue area;

when the interval between the first touch operation and the second touch operation is smaller than the predetermined value, switching the portable apparatus to a relative coordinate mode, and determining whether a second display position on the screen mapped to a second touch position of the second touch operation on the touch pad is within the cue area;

executing an operation function on an object within the cue area if the second display position is within the cue area; and moving the cue area to the second display position if the second display position is not within the cue area.

2. The operation method according to claim 1, wherein the step of detecting the first touch operation by using the touch pad and displaying the cue area at the first display position on the screen mapped to the first touch position of the first touch operation further comprises:

detecting a first drag path of the first touch operation, and moving the cue area according to a first moving path on the screen mapped to the first drag path.

3. The operation method according to claim 1, wherein after the step of detecting the first touch operation by using the touch pad and displaying the cue area at the first display position on the screen mapped to the first touch position of the first touch operation, the operation method further comprises:

accumulating an idle time of the touch pad during which the second touch operation is not detected, and determining whether the idle time exceeds a predetermined time; and     removing the cue area and detecting a next touch operation to display the cue area when the idle time exceeds the predetermined time.

4. The operation method according to claim 1, wherein if the second display position on the screen mapped to the second touch position of the second touch operation is within the cue area, the operation method further comprises:

detecting a second drag path of the second touch operation, and moving the cue area according to a second moving path on the screen mapped to the second drag path.

5. The operation method according to claim 4, wherein after the step of detecting the second drag path of the second touch operation and moving the cue area according to the second moving path on the screen mapped to the second drag path, the operation method further comprises:

detecting a third touch operation by using the touch pad, and determining whether a third display position on the screen mapped to a third touch position of the third touch operation is within the cue area;

executing the operation function on the object within the cue area if the third display position is within the cue area; and     moving the cue area to the third display position if the third display position is not within the cue area.

6. A portable apparatus, comprising:

a screen, having a display area;

a touch pad, coupled to the screen, and having a touch area, wherein the touch area of the touch pad is mapped to the display area of the screen; and a processing unit, coupled to the screen and the touch pad, and configured to detect a first touch operation through the touch pad, during which the portable apparatus is in an absolute coordinate mode, display a cue area at a first display position on the screen mapped to a first touch position of the first touch operation, detect a second touch operation through the touch pad, and determine an interval between the first touch operation and the second touch operation, wherein when the interval between the first touch operation and the second touch operation exceeds a predetermined value, the processing unit removes the cue area;

when the interval between the first touch operation and the second touch operation is smaller than the predetermined value, the processing unit switches the portable apparatus to a relative coordinate mode, and determines whether a second display position on the screen mapped to a second touch position of the second touch operation is within the cue area, wherein if the second display position is within the cue area, the processing unit executes an operation function on an object within the cue area, and if the second display position is not within the cue area, the processing unit moves the cue area to the second display position.

7. The portable apparatus according to claim 6, wherein the processing unit further detects a first drag path of the first touch operation through the touch pad and moves the cue area according to a first moving path on the screen mapped to the first drag path.

8. The portable apparatus according to claim 6, wherein the processing unit further accumulates an idle time of the touch pad during which the second touch operation is not detected and determines whether the idle time exceeds a predetermined time, and when the idle time exceeds the predetermined time, the processing unit removes the cue area and detects a next touch operation through the touch pad to display the cue area.

9. The portable apparatus according to claim 6, wherein the processing unit further detects a second drag path of the second touch operation through the touch pad and moves the cue area according to a second moving path on the screen mapped to the second drag path.

10. The portable apparatus according to claim 6, wherein the processing unit further detects a third touch operation through the touch pad and determines whether a third display position on the screen mapped to a third touch position of the third touch operation is within the cue area, wherein if the third display position is within the cue area, the processing unit executes the operation function on the object within the cue area, and if the third display position is not within the cue area, the processing unit moves the cue area to the third display position.

11. A portable apparatus, comprising:

a screen, having a display area;

a touch pad, coupled to the screen, and having a touch area, wherein the touch area of the touch pad is mapped to the display area of the screen; and a processing unit, coupled to the screen and the touch pad, wherein the processing unit detects a first touch operation through the touch pad, during which the portable apparatus is in an absolute coordinate mode, and the processing unit displays a cue area at a first display position on the screen mapped to a first touch position of the first touch operation, detects a second touch operation through the touch pad, and determines an interval between the first touch operation and the second touch operation, wherein when the interval between the first touch operation and the second touch operation is smaller than a predetermined value, the processing unit switches the portable apparatus to a relative coordinate mode;

when the interval between the first touch operation and the second touch operation exceeds the predetermined value, the processing unit does not switch the portable apparatus and removes the cue area.

\* \* \* \* \*